(12) United States Patent
Uchino et al.

(10) Patent No.: US 10,687,363 B2
(45) Date of Patent: *Jun. 16, 2020

(54) MOBILE STATION

(71) Applicant: NTT DOCOMO, INC., Tokyo (JP)

(72) Inventors: Tooru Uchino, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/465,086

(22) Filed: Mar. 21, 2017

(65) Prior Publication Data

US 2017/0196024 A1 Jul. 6, 2017

Related U.S. Application Data

(63) Continuation of application No. 14/371,243, filed as application No. PCT/JP2013/050280 on Jan. 10, 2013, now Pat. No. 9,642,164.

(30) Foreign Application Priority Data

Jan. 30, 2012 (JP) ................... 2012-017372

(51) Int. Cl.
*H04W 74/08* (2009.01)
*H04W 52/34* (2009.01)
(Continued)

(52) U.S. Cl.
CPC ....... *H04W 74/0833* (2013.01); *H04W 52/34* (2013.01); *H04W 52/36* (2013.01);
(Continued)

(58) Field of Classification Search
CPC . H04W 74/0833; H04W 52/36; H04W 52/34; H04W 52/0216; H04W 72/042
See application file for complete search history.

(56) References Cited

U.S. PATENT DOCUMENTS 8,953,541 B2 2/2015 Jang et al.
9,252,936 B2 2/2016 Olsson et al.
(Continued)

FOREIGN PATENT DOCUMENTS

| WO | 2008/108226 A1 | 9/2008 |
| WO | 2009/020109 A1 | 2/2009 |
| WO | 2010/077122 A2 | 7/2010 |

OTHER PUBLICATIONS

International Search Report for corresponding International Application No. PCT/JP2013/050280, dated Feb. 19, 2013 (1 page).

(Continued)

*Primary Examiner* — Khaled M Kassim
*Assistant Examiner* — Syed Ali
(74) *Attorney, Agent, or Firm* — Osha Liang LLP

(57) ABSTRACT

An object is to increase opportunities for starting "Interband CA". A mobile station UE of the present invention includes a transmission unit 14 configured to postpone transmission of a random access preamble in a cell #2 when the mobile station UE in a "RRC_Connected state" in a cell #1 detects a start trigger of a random access procedure in the cell #2, and determines that an uplink signal is being transmitted in the cell #1. The transmission unit 14 performs the postponed transmission of the random access preamble upon completing the transmission of the uplink signal in the cell #1.

2 Claims, 8 Drawing Sheets

(51) Int. Cl.
*H04W 56/00* (2009.01)
*H04W 72/04* (2009.01)
*H04W 52/36* (2009.01)
*H04W 76/18* (2018.01)
*H04W 76/15* (2018.01)

(52) U.S. Cl.
CPC ..... *H04W 56/002* (2013.01); *H04W 72/0446* (2013.01); *H04W 76/15* (2018.02); *H04W 76/18* (2018.02)

(56) References Cited

U.S. PATENT DOCUMENTS

| | | | |
|---|---|---|---|
| 9,642,164 B2 * | 5/2017 | Uchino | H04W 52/34 |
| 2010/0091725 A1 | 4/2010 | Ishii | |
| 2010/0098010 A1 | 4/2010 | Kuo | |
| 2010/0113051 A1 | 5/2010 | Du et al. | |
| 2010/0248708 A1 | 9/2010 | Koivisto et al. | |
| 2011/0002262 A1 | 1/2011 | Wang et al. | |
| 2011/0058529 A1 | 3/2011 | Uemura | |
| 2012/0176967 A1 | 7/2012 | Kim et al. | |
| 2012/0190363 A1 * | 7/2012 | Maeda | H04W 36/38 455/435.1 |
| 2012/0250662 A1 * | 10/2012 | Kuo | H04W 36/08 370/336 |
| 2012/0300714 A1 * | 11/2012 | Ng | H04W 56/0045 370/329 |
| 2013/0028207 A1 * | 1/2013 | Okubo | H04L 1/0031 370/329 |
| 2013/0201960 A1 | 8/2013 | Kim et al. | |
| 2013/0322339 A1 * | 12/2013 | Ohta | H04L 5/001 370/328 |
| 2014/0010173 A1 | 1/2014 | Zakrzewski | |
| 2014/0018085 A1 * | 1/2014 | Young | H04W 52/0235 455/450 |
| 2014/0126489 A1 | 5/2014 | Zakrzewski | |
| 2014/0233524 A1 | 8/2014 | Jang et al. | |
| 2015/0230156 A1 * | 8/2015 | Hayami | H04W 48/06 455/434 |
| 2015/0237566 A1 * | 8/2015 | Lee | H04W 48/08 370/230 |

OTHER PUBLICATIONS

Written Opinion for corresponding International Application No. PCT/JP2013/050280, dated Feb. 19, 2013 (3 pages).
Fujitsu; "PDCCH order and RA selection;" 3GPP TSG-RAN WG2 Meeting #70, R2-103083; Montreal, Canada; May 10-14, 2010 (3 pages).
3GPP TS 36.321 V10.4.0; "3rd Generation Partnership Project; Technical Specification Group Radio Access Network; Evolved Universal Terrestrial Radio Access (E-UTRA); Medium Access Control (MAC) protocol specification (Release 10);" Dec. 2011 (54 pages).
Extended Search Report issued in corresponding European Application No. 13744391.7, dated Jul. 31, 2015 (9 pages).
Alcatel-Lucent et al.; "Multiple Timing Advances for Carrier Aggregation"; 3GPP TSG RAN WG1 Meeting #66bis, R1-113314; Zhuhai, China; Oct. 10-14, 2011 (4 pages).
HTC; "The prioritization of RACH"; 3GPP TSG-RAN2 #75bis meeting, R2-115148; Zhuhai, China; Oct. 10-14, 2011 (3 pages).
ZTE; "Issues of PRACH transmission on SCell"; 3GPP TSG RAN WG1 Meeting #67, R1-113761; San Francisco, USA ; Nov. 14-18, 2011 (3 pages).
Notification of Reasons for Refusal issued in the counterpart Japanese Patent Application No. 2012-017372, dated Nov. 4, 2015 (5 pages).
HTC; "Considerations on RA on SCell"; 3GPP TSG-RAN2 Meeting #75, R2-114001; Athens, Greece; Aug. 22-26, 2011 (2 pages).
Office Action issued in the counterpart European Patent Application No. 13744391.7, dated Jun. 5, 2018 (8 pages).
Office Action issued in the counterpart European Patent Application No: 13744391.7, dated Dec. 19, 2019 (6 Pages).

* cited by examiner

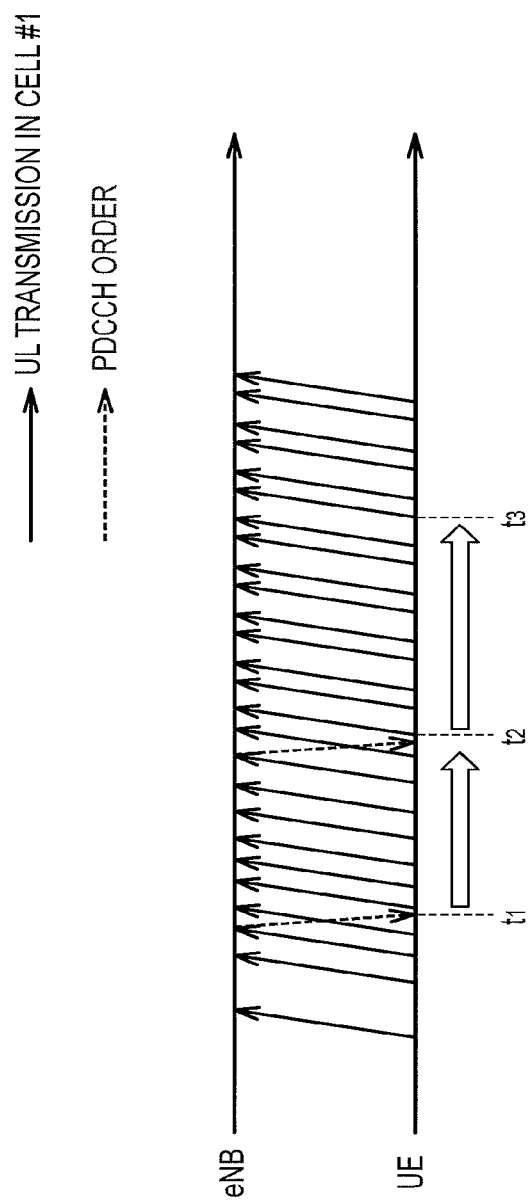

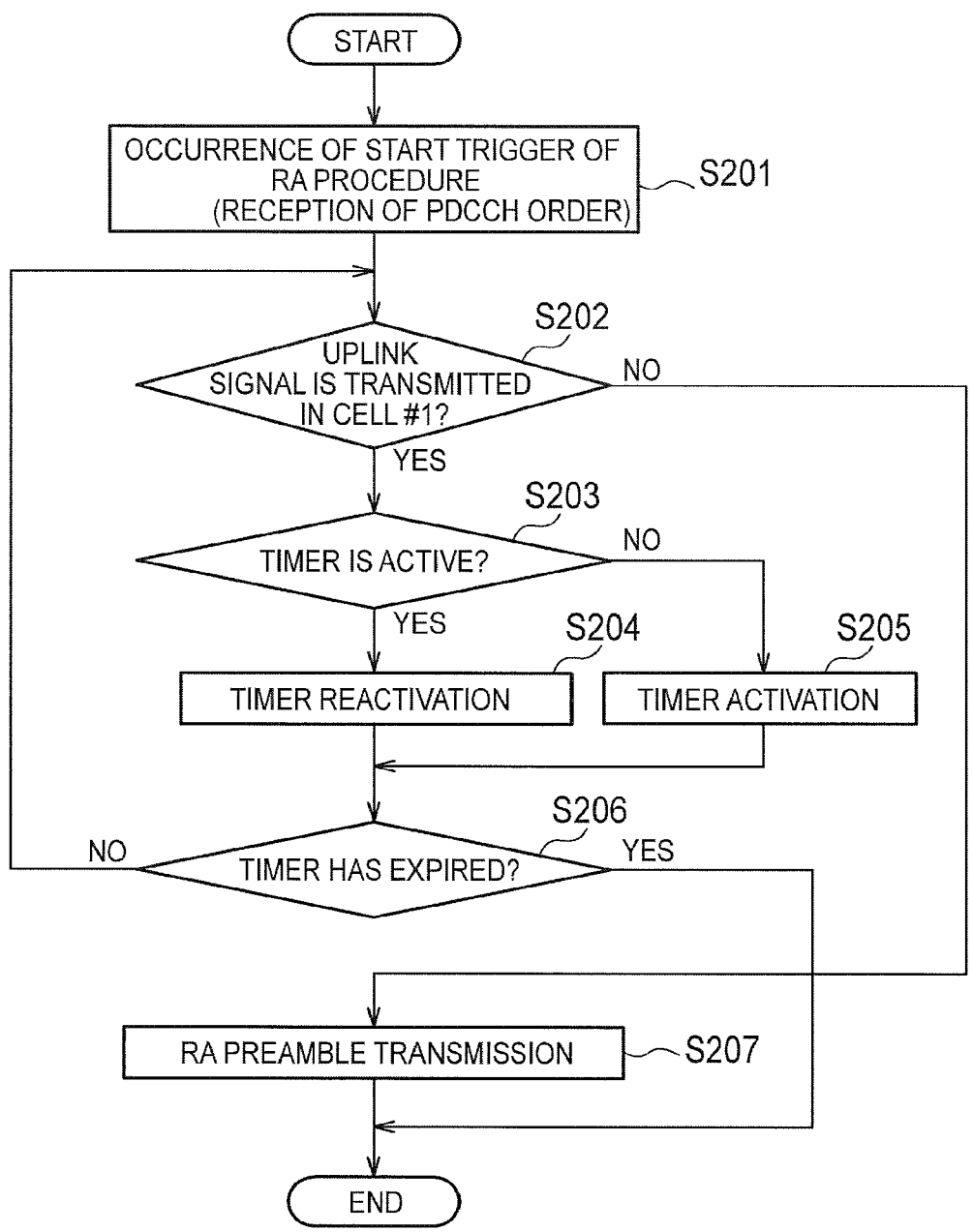

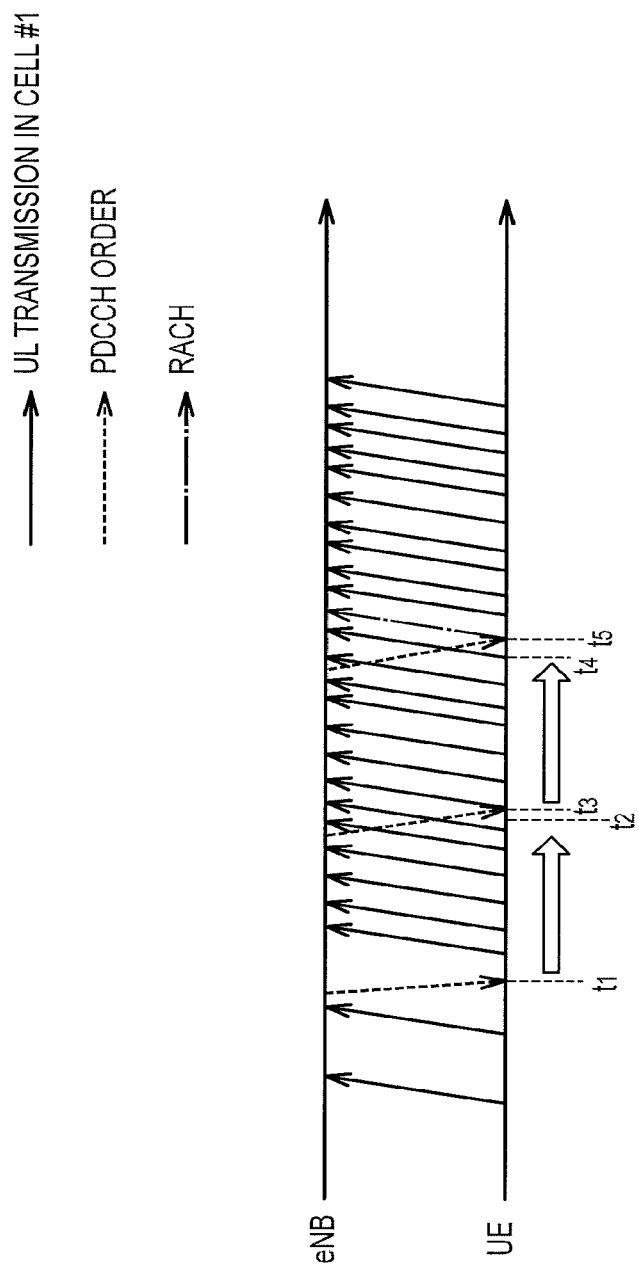

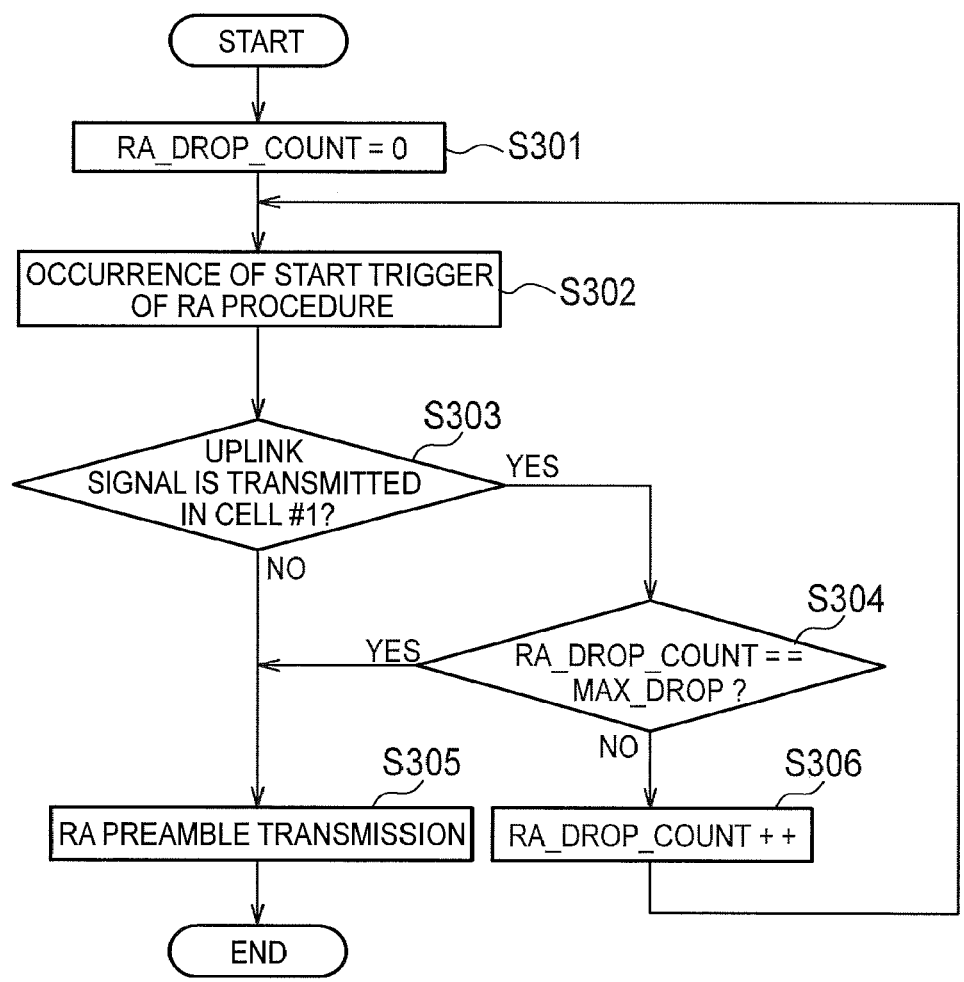

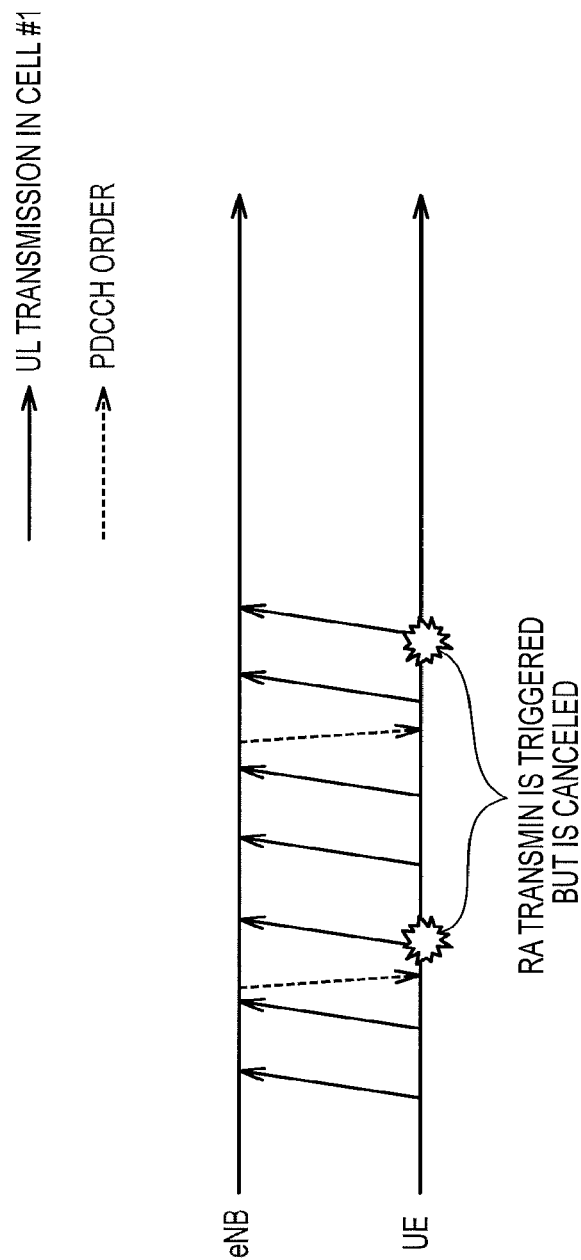

US 10,687,363 B2

MOBILE STATION

TECHNICAL FIELD

The present invention relates to a mobile station.

BACKGROUND ART

CA (Carrier Aggregation) can be performed in LTE (Long Term Evolution)—Advanced.

The types of CA include "Inter-band CA (CA between different frequency bands)" and "Intra-band CA (CA in the same frequency band)".

A mobile station UE is configured to be capable of setting a reliable "Pcell (Primary cell)" and an additional "Scell (Secondary cell)" in a case of performing CA.

Specifically, the mobile station UE is configured to be capable of setting the "Pcell" and then additionally setting the "Scell" if necessary.

For example, in a case of performing CA, the mobile station UE may send an uplink data signal through a PUSCH (Physical Uplink Shared Channel) in a cell #1 and simultaneously send the uplink data signal through the PUSCH also in a cell #2. Alternatively, the mobile station UE may send an uplink control signal through a PUCCH (Physical Uplink Control Channel) in the cell #1 and simultaneously send the uplink data signal through the PUSCH in the cell #2. As another alternative, the mobile station UE may send the uplink data signal through the PUSCH in the cell #1 and simultaneously send a random access preamble through a RACH (Random Access Channel) in the cell #2.

Moreover, in a case of performing "Inter-band CA", the mobile station UE is configured to be capable of transmitting the uplink signals simultaneously in multiple cells ("Pcell" and "Scell") operated by carriers of different frequency bands.

PRIOR ART DOCUMENT

Non-Patent Document

Non-patent document 1: 3GPP TS36.321

SUMMARY OF THE INVENTION

When "Inter-band CA" is performed, synchronization needs to be performed (i.e. a RA procedure needs to be performed) for each of the carriers of the respective frequency bands because radio characteristics (a delay characteristic, an attenuation characteristic, and the like) vary between frequency bands.

For example, when the mobile station UE in a "RRC_Connected state" starts to preform "Inter-band CA" in the cell #1 ("Pcell"), e.g., starts to transmit uplink signals in the cell #1 ("Pcell") and the cell 2# (Scell), the mobile station UE needs to transmit the random access preamble through the RACH in the cell #2.

In such a case, since maximum transmission electric power of the mobile station UE is limited, there is a risk that a radio base station eNB may not receive both of the uplink data signal in the cell #1 and the random access preamble in the cell #2, depending on a distribution method of transmission electric power in the cell #1 and the cell #2.

To avoid such a risk, it is conceivable to cancel the transmission of the random access preamble in the cell #2 as shown in FIG. 9 when the mobile station UE is to simultaneously transmit the uplink data signal through the PUSCH in the cell #1 and transmit the random access preamble through the RACH in the cell #2.

However, this idea has a problem that, since the radio base station eNB receives no random access preamble in the cell #2 as a result of the cancellation, the mobile station UE can never start the "Inter-band CA"

The present invention has been made in view of the problems described above and an object thereof is to provide a mobile station which can increase opportunities for starting the "Inter-band CA".

A first feature of the present invention is summarized as a mobile station including a transmission unit configured to postpone transmission of a random access preamble in a second cell when the mobile station in a connected state in a first cell detects a start trigger of a random access procedure in the second cell, and determines that an uplink signal is being transmitted in the first cell, wherein the transmission unit performs the postponed transmission of the random access preamble upon completing the transmission of the uplink signal in the first cell.

BRIEF DESCRIPTION OF THE DRAWINGS

FIG. 5 is a diagram for explaining an operation of the mobile station in a modified example 1 of the present invention.

FIG. 6 is a flowchart showing the operation of the mobile station in the modified example 1 of the present invention.

FIG. 7 is a diagram for explaining an operation of the mobile station in a modified example 2 of the present invention.

FIG. 8 is a flowchart showing the operation of the mobile station in the modified example 2 of the present invention.

FIG. 9 is a diagram for explaining problems in a conventional mobile communication system.

DETAILED DESCRIPTION

Mobile Communication System in First Embodiment of Present Invention

A mobile communication system in a first embodiment of the present invention is described with reference to FIGS. 1 to 4.

Figure 1:
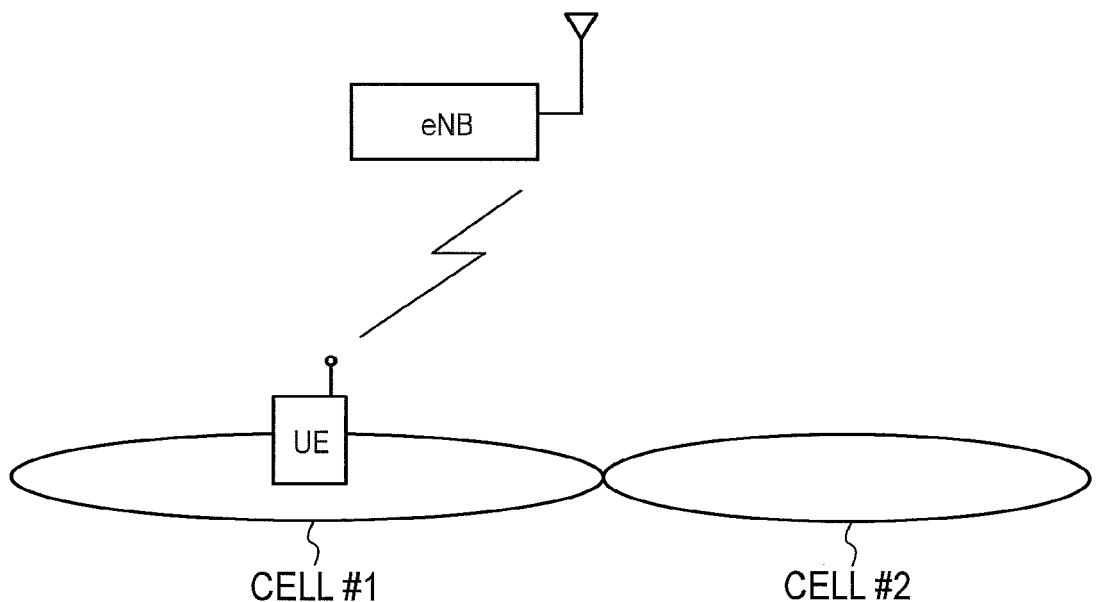
FIG. 1 is an overall configuration view of a mobile communication system in a first embodiment of the present invention.

As shown in FIG. 1, the mobile communication system in the embodiment is configured to support LTE-advanced and includes a radio base station eNB configured to manage a cell #1 and a cell #2 operated by carriers of different frequency bands.

Note that the mobile communication system of the embodiment is configured to support "Inter-band CA". Specifically, a mobile station UE is configured to be capable of transmitting uplink signals simultaneously to the cell #1 and the cell #2.

In the embodiment, description is given below by using an example of a case where, when the mobile station UE is in a "RRC_Connected state" in the cell #1 ("Pcell") under the radio base station eNB, the radio base station eNB instructs the mobile station UE to add and set the cell #2 as a "Scell".

Figure 2:
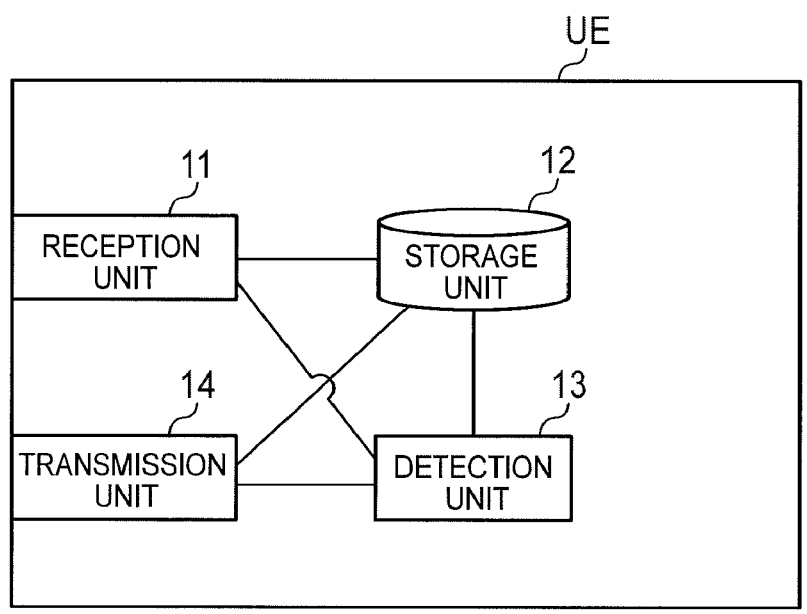
FIG. 2 is a functional block diagram of a mobile station in the first embodiment of the present invention.

As shown in FIG. 2, the mobile station UE in the embodiment includes a reception unit 11, a storage unit 12, a detection unit 13, and a transmission unit 14.

The reception unit 11 is configured to receive various signals transmitted by the radio base station eNB.

For example, the reception unit 11 is configured to receive a "PDCCH order" transmitted by the radio base station eNB. Here, the "PDCCH order" is a signal instructing the mobile station UE to start a RA (Random Access) procedure in a predetermined cell.

Note that the RA procedure includes a "Non-Contention based RA (Contention Free RA) procedure" and a "Contention based RA procedure".

The "Non-Contention based RA procedure" is a procedure initiated by an instruction from the radio base station eNB in a case of, for example, "DL data resuming (downlink data resuming)" and "handover".

Meanwhile, the "Contention based RA procedure" is a procedure autonomously initiated by the mobile station UE in a case of, for example, "Initial Access" and "UL data resuming (uplink data resuming)".

The storage unit 12 is configured to store a "dedicated Preamble" to be used in the "Non-Contention based RA procedure" designated by the "PDCCH order".

The detection unit 13 is configured to detect a start trigger of the RA procedure. For example, the detection unit 13 is configured to detect the start trigger of the RA procedure when the mobile station UE determines to perform the "Initial Access" or the "UL data resuming".

Moreover, the detection unit 13 is configured to determine that the start trigger of the RA procedure is detected when the reception unit 11 receives the "PDCCH order" from the radio base station eNB in a predetermined cell.

The transmission unit 14 is configured to transmit various signals to the radio base station eNB.

For example, the transmission unit 14 is configured to transmit the uplink signal to the radio base station eNB in the cell #1 and transmit a random access preamble to the radio base station eNB in the cell #2.

Moreover, the transmission unit 14 is configured to determine whether the uplink signal is being transmitted in the cell #1 when the detection unit 13 detects the start trigger of the RA procedure in the cell #2.

Furthermore, the transmission unit 14 may be configured as follows. When the detection unit 13 detects the start trigger of the RA procedure in the cell #2, the transmission unit 14 not only determines whether the uplink signal is being transmitted in the cell #1 but also determines whether the mobile station UE can secure electric power sufficient for the transmission of the random access preamble (i.e. the "dedicated Preamble" stored in the storage unit 12) in cell #2 and the transmission of the uplink signal in the cell #1.

Here, the transmission unit 14 is configured to postpone the transmission of the random access preamble (i.e. the "dedicated Preamble" stored in the storage unit 12) in the cell #2 when determining that the uplink signal is being transmitted in the cell #1.

Figure 3:
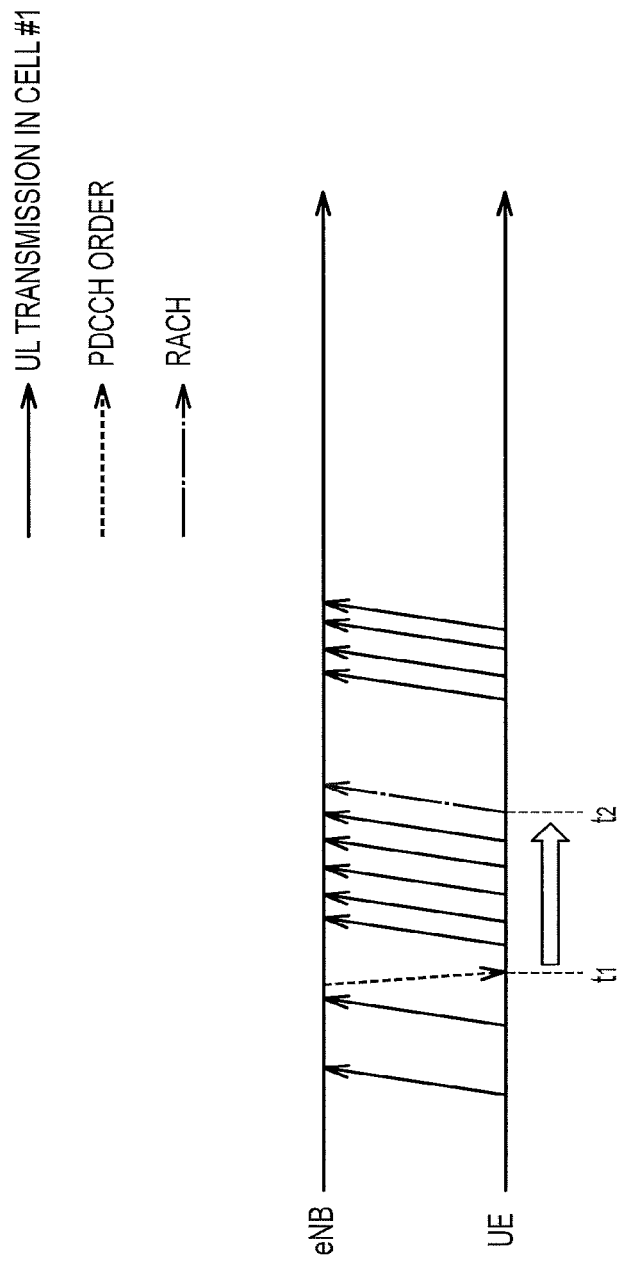
FIG. 3 is a diagram for explaining an operation of the mobile station in the first embodiment of the present invention.

For example, the transmission unit 14 is configured as follows. As shown in FIG. 3, at a time point t1, when the reception unit 11 receives the "PDCCH order" transmitted by the radio base station eNB, i.e. when the detection unit 13 detects the start trigger of the RA procedure in the cell #2, the transmission unit 14 postpones the transmission of the random access preamble (i.e. the "dedicated Preamble"

stored in the storage unit 12) in the cell #2 because the uplink signal is being transmitted in the cell #1.

Thereafter, at a time point t2, the transmission unit 14 detects that the transmission of the uplink signal in the cell #1 is completed, and performs the postponed transmission of the random access preamble (i.e. the "dedicated Preamble" stored in the storage unit 12).

An example of an operation of the mobile communication system in the first embodiment of the present invention is described below with reference to FIG. 4.

Figure 4:
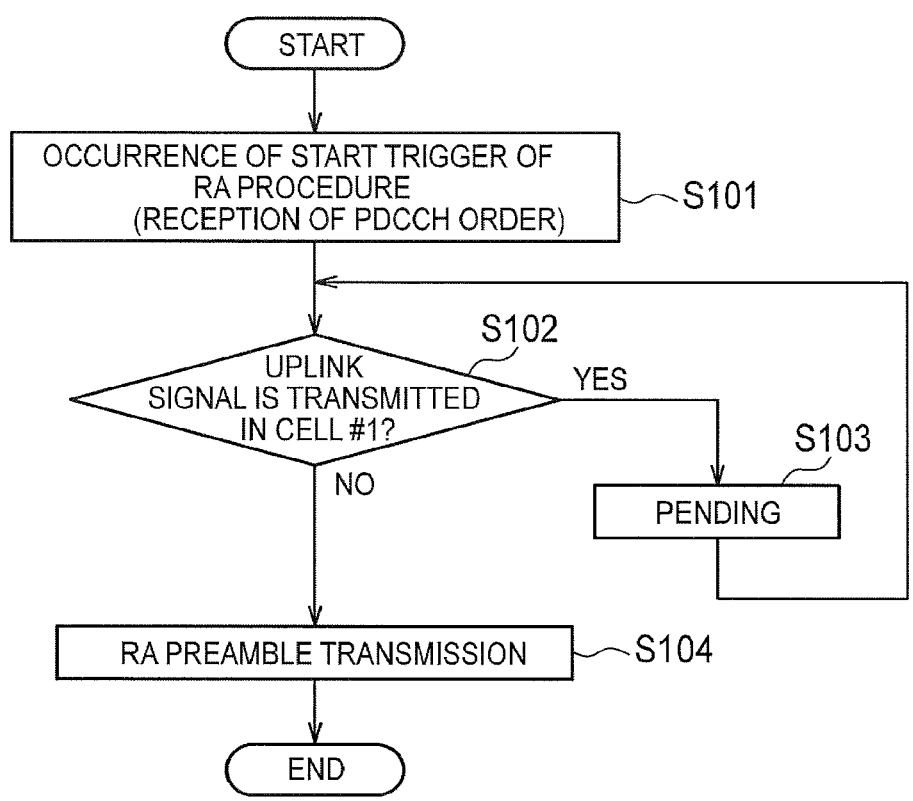
FIG. 4 is a flowchart showing the operation of the mobile station in the first embodiment of the present invention.

As shown in FIG. 4, when the mobile station UE detects the start trigger of the RA procedure in step S101, the mobile station UE determines whether the uplink signal is being transmitted in the cell #1 in step S102.

When the determination result is "YES", the operation proceeds to step S103. Meanwhile, when the determination result is "NO", the operation proceeds to step S104.

In step S103, the mobile station UE postpones the transmission of the random access preamble (i.e. the "dedicated Preamble" stored in the storage unit 12) in the cell #2.

In step S104, the mobile station UE transmits the random access preamble (i.e. the "dedicated Preamble" stored in the storage unit 12) in the cell #2.

In the invention of the embodiment, when the mobile station UE detects the start trigger of the RA procedure in the cell #2 and the uplink signal is being transmitted in the cell #1, the mobile station UE can postpone the transmission of the random access preamble (i.e. the "dedicated Preamble" stored in the storage unit 12) in the cell #2, and transmit this random access preamble (i.e. the "dedicated Preamble" stored in the storage unit 12) after the transmission of the uplink signal in the cell #1 is completed. Accordingly, the opportunities for starting the "Inter-band CA" can be increased.

Modified Example 1

A mobile communication system in a modified example 1 of the present invention is described with reference to FIGS. 5 and 6. Description is given below of the mobile communication system in the modified example 1 while focusing on points different from the aforementioned mobile communication system of the embodiment 1.

In the mobile communication system of the modified example 1, the transmission unit 14 is configured as follows. When the transmission unit 14 postpones the transmission of the random access preamble (i.e. the "dedicated Preamble" stored in the storage unit 12) in the cell #2 for a predetermined period, the transmission unit 14 cancels the transmission of this random access preamble (i.e. the "dedicated Preamble" stored in the storage unit 12) in the cell #2.

Specifically, when the transmission unit 14 starts the postponing of the transmission of the random access preamble (i.e. the "dedicated Preamble" stored in the storage unit 12) in the cell #2, the transmission unit 14 activates a predetermined timer. When the transmission of the uplink signal in the cell #1 is not completed before expiration of the predetermined timer, the transmission unit 14 cancels the postponed transmission of the random access preamble (i.e. the "dedicated Preamble" stored in the storage unit 12) in the cell #2.

In such a case, the storage unit 12 is configured to release the "dedicated Preamble" stored therein.

For example, the transmission unit 14 is configured as follows. As shown in FIG. 5, at a time point t1, when the reception unit 11 receives the "PDCCH order" transmitted by the radio base station eNB, i.e. when the detection unit 13 detects the start trigger of the RA procedure in the cell #2, the transmission unit 14 postpones the transmission of the random access preamble (i.e. the "dedicated Preamble" stored in the storage unit 12) in the cell #2 because the uplink signal is being transmitted in the cell #1, and activates the predetermined timer.

At a time point t2, when the reception unit 11 receives the "PDCCH order", transmitted by the radio base station eNB, again before the expiration of the predetermined timer, i.e. when the detection unit 13 detects the start trigger of the RA procedure in the cell #2 again before the expiration of the predetermined timer, the transmission unit 14 cancels the postponed transmission of the random access preamble (i.e. the "dedicated Preamble" stored in the storage unit 12) in the cell #2, reactivates the predetermined timer, and postpones the transmission of the random access preamble (i.e. the "dedicated Preamble" stored in the storage unit 12) in the cell #2 designated by the later-received "PDCCH order".

At a time point t3, since the transmission of the uplink signal in the cell #1 is not completed before the expiration of the predetermined timer, the transmission unit 14 cancels the postponed transmission of the random access preamble (i.e. the "dedicated Preamble" stored in the storage unit 12) in the cell #2.

An example of an operation of the mobile communication system in the modified example 1 is described below with reference to FIG. 6.

As shown in FIG. 6, when the mobile station UE detects the start trigger of the RA procedure in step S201, the mobile station UE determines whether the uplink signal is being transmitted in the cell #1 in step S202.

When the determination result is "YES", the operation proceeds to step S203. Meanwhile, when the determination result is "NO", the operation proceeds to step S207.

In step S203, the mobile station UE determines whether the predetermined timer is activated.

When the determination result is "YES", the operation proceeds to step S204. Meanwhile, when the determination result is "NO", the operation proceeds to step S205.

In step S204, the mobile station UE reactivates the predetermined timer and cancels the postponed transmission of the random access preamble (i.e. the "dedicated Preamble" stored in the storage unit 12) in the cell #2.

Meanwhile, in step S205, the mobile station UE activates the predetermined timer.

In step S206, the mobile station UE determines whether the predetermined timer has expired.

When the determination result is "YES", the operation is terminated. In this case, the mobile station UE cancels the postponed transmission of the random access preamble (i.e. the "dedicated Preamble" stored in the storage unit 12) in the cell #2.

Meanwhile, when the determination result is "NO", the operation returns to step S202.

In step S207, the mobile station UE performs the postponed transmission of the random access preamble (i.e. the "dedicated Preamble" stored in the storage unit 12) in the cell #2.

In the modified example 1, when the transmission of the uplink signal in the cell #1 is not completed before the expiration of the predetermined timer, the mobile station UE cancels the postponed transmission of the random access preamble (i.e. the "dedicated Preamble" stored in the storage unit 12) in the cell #2. This allows the random access preamble to be appropriately reused while increasing the opportunities for starting the "Inter-band CA".

Modified Example 2

A mobile communication system in a modified example 2 of the present invention is described with reference to FIGS. 7 and 8. Description is given below of the mobile communication system in the modified example 2 while focusing on points different from the aforementioned mobile communication system of the embodiment 1.

In the mobile communication system of the modified example 2, the transmission unit 14 is configured as follows. When the transmission unit 14 postpones (or cancels) the transmission of the random access preamble in the cell #2 a predetermined number of times, the transmission unit 14 performs the following operation. Upon next detection of the start trigger of the random access procedure in the cell #2, the transmission unit 14 performs the transmission of the random access preamble in the cell #2 without postponing it even if the transmission unit 14 determines that the uplink signal is being transmitted in the cell #1.

For example, the transmission unit 14 is configured as follows. As shown in FIG. 7, at a time point t1, when the reception unit 11 receives the "PDCCH order" transmitted by the radio base station eNB, i.e. when the detection unit 13 detects the start trigger of the RA procedure in the cell #2, the transmission unit 14 postpones the transmission of the random access preamble (i.e. the "dedicated Preamble" stored in the storage unit 12) in the cell #2 because the uplink signal is being transmitted in the cell #1, and activates the predetermined timer.

At a time point t2, since the predetermined timer has expired before the transmission of the uplink signal in the cell #1 is completed, the transmission unit 14 cancels the postponed transmission of the random access preamble (i.e. the "dedicated Preamble" stored in the storage unit 12) in the cell #2.

At a time point t3, when the reception unit 11 receives the "PDCCH order" transmitted by the radio base station eNB, i.e. when the detection unit 13 detects the start trigger of the RA procedure in the cell #2, the transmission unit 14 postpones the transmission of the random access preamble (i.e. the "dedicated Preamble" stored in the storage unit 12) in the cell #2 because the uplink signal is being transmitted in the cell #1, and activates the predetermined timer.

At a time point t4, since the predetermined timer has expired before the transmission of the uplink signal in the cell #1 is completed, the transmission unit 14 cancels the postponed transmission of the random access preamble (i.e. the "dedicated Preamble" stored in the storage unit 12) in the cell #2.

Note that the transmission unit 14 retransmits the postponed random access preamble in the cell #2, until the expiration of the predetermined timer.

At a time point t5, the reception unit 11 receives the "PDCCH order" transmitted by the radio base station eNB, i.e. the detection unit 13 detects the start trigger of the RA procedure in the cell #2. At this time, although the uplink signal is being transmitted in the cell #1, the transmission unit 14 performs the transmission of the random access preamble (i.e. the "dedicated Preamble" stored in the storage unit 12) in the cell #2 without postponing it because the transmission unit 14 has postponed the transmission of the random access preamble in the cell #2 the predetermined number of times (twice in this case). Here, the predetermined number of times may include the number of the aforementioned retransmissions of the random access preamble or may not include the number of the aforementioned retransmissions of the random access preamble.

In such a case, the transmission unit 14 cancels the transmission of the uplink signal in the cell #1.

An example of an operation of the mobile communication system in the modified example 2 is described below with reference to FIG. 8.

As shown in FIG. 8, the mobile station UE sets a variable "RA_drop_count" to "0" in step S301. Then, when the mobile station UE detects the start trigger of the RA procedure in step S302, the mobile station UE determines whether the uplink signal is being transmitted in the cell #1 in step S303.

When the determination result is "YES", the operation proceeds to step S304. Meanwhile, when the determination result is "NO", the operation proceeds to step S305.

The mobile station UE may reset the aforementioned predetermined timer and reset the value of the variable "RA_drop_count" upon detecting the start trigger of the RA procedure, that is, for example, upon receiving the "PDCCH order".

In step 304, the mobile station UE determines whether the variable "RA_drop_count" is equal to "max=drop". Here, the "max=drop" is a parameter which is set to the aforementioned predetermined number of times.

When the determination result is "YES", the operation proceeds to step S305. Meanwhile, when the determination result is "NO", the operation proceeds to step S306.

In step S305, the mobile station UE performs the postponed transmission of the random access preamble (i.e. the "dedicated Preamble" stored in the storage unit 12) in the cell #2.

In step S306, the mobile station UE increments the value of the variable "RA_drop_count" by "1".

Here, the mobile station UE retransmits the postponed random access preamble in the cell #2, until the expiration of the predetermined timer. When this retransmission fails, the mobile station UE may increment the value of the variable "RA_drop_count" by "1." Instead, the mobile station UE may increment the value of the variable "RA_drop_count" by "1" every time the random access preamble is retransmitted.

Moreover, the transmission unit 14 may be configured as follows. The transmission unit 14 sets a degree of priority for each of the transmission of the uplink signal and the transmission of the random access preamble. When the transmission of the random access preamble in the cell #2 is postponed (or canceled) a predetermined number of times, the transmission unit 14 increases the degree of priority set for the transmission of random access preamble.

In such a case, the transmission unit 14 is configured such that, when the start trigger of the RA procedure in the cell #2 is detected and the uplink signal is being transmitted in the cell #1, the transmission unit 14 performs one of the transmission of the uplink signal in the cell #1 and the transmission of the random access preamble in the cell #2 which has the higher degree of priority, and cancels the other one which has the lower degree of priority.

Moreover, the transmission unit 14 may be configured to increase the degree of priority set for the transmission of the random access preamble in the cell #2 when a predetermined period elapses from the first cancellation of the transmission of the random access preamble in the cell #2.

In the modified example 2, the mobile station UE can suppress effects on the transmission of the uplink signal in the cell #1 to a minimum while increasing the opportunities for starting the "Inter-band CA", by limiting the number of consecutive cancellations of the transmission of the random access preamble in the cell #2.

The characteristics of the embodiment described above can be expressed as follows.

A first feature of the embodiment is summarized as the mobile station UE including the transmission unit 14 configured to postpone the transmission of the random access preamble in the cell #2 (second cell) when the mobile station UE in the "RRC_Connected state (connected state)" in the cell #1 (first cell) detects a start trigger of a random access procedure in the cell #2 and determines that the uplink signal is being transmitted in the cell #1, wherein the transmission unit 14 performs the postponed transmission of the random access preamble upon completing the transmission of the uplink signal in the cell #1.

In the first feature of the embodiment, the transmission unit 14 may cancel the postponed transmission of the random access preamble in the cell #2 when the transmission of the random access preamble is postponed for a predetermined period.

In the first feature of the embodiment, when the transmission unit 14 postpones (or cancels) the transmission of the random access preamble in the cell #2 the predetermined number of times, the transmission unit 14 performs the transmission of the random access preamble in the cell #2 without postponing it upon next detection of the start trigger of the random access procedure in the cell #2, even if the mobile station determines that the uplink signal is being transmitted in the cell #1.

In the first feature of the embodiment, the transmission unit 14 may postpone the transmission of the random access preamble in the cell #2 when the mobile station UE is in the "RRC_Connected state" in the cell #1; detects the start trigger for the random access procedure in the cell #2; determines that the uplink signal is being transmitted in the cell #1; and is unable to secure a sufficient amount of electric power required for transmission of the random access preamble and the uplink signal.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE or the radio base station eNB. Otherwise, the storage medium and the processor may be provided as discrete components inside the mobile station UE or the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire contents of Japanese Patent Application No. 2012-017372 (filed on Jan. 30, 2012) are incorporated by reference in the present specification.

INDUSTRIAL APPLICABILITY

As described above, the present invention can provide a mobile station which can increase the opportunities for starting the "Inter-band CA".

EXPLANATION OF THE REFERENCE NUMERALS

UE mobile station
eNB radio base station
reception unit
storage unit
detection unit
transmission unit

The invention claimed is:
1. A mobile station comprising:
a processor configured to detect a start trigger of a random access procedure in a second cell; and
a transmitter coupled to the processor that transmits a random access preamble in the second cell, wherein when the mobile station is in a RRC connected state in a first cell and detects the start trigger of the random access procedure in the second cell, the processor controls transmission of the random access preamble in the second cell based on whether a total power of power for transmitting the uplink signal in the first cell and a power for transmitting the random access preamble in the second cell exceeds a maximum transmission electric power of the mobile station,
wherein the processor further controls cancellation of the transmission of the random access preamble in the second cell when a predetermined period elapses from the postponing of the start of transmission of the random access preamble, and
wherein the processor controls simultaneous transmission of the uplink signal in the first cell and the random access preamble in the second cell.
2. The mobile station according to claim 1, wherein the processor further controls a transmission of the postponed transmission of the random access preamble in the second cell after completing the transmission of the uplink signal in the first cell.

* * * * *